Inventor
Bertis H. Urschel
By
Attorney

May 4, 1943.  B. H. URSCHEL  2,318,344
VEHICLE STABILIZER-FORMING APPARATUS
Filed Oct. 16, 1940  6 Sheets-Sheet 5

Inventor
Bertis H. Urschel

May 4, 1943.  B. H. URSCHEL  2,318,344
VEHICLE STABILIZER-FORMING APPARATUS
Filed Oct. 16, 1940   6 Sheets-Sheet 6

Inventor
Bertis H. Urschel
By Haust F. Crampton
Attorney

Patented May 4, 1943

2,318,344

UNITED STATES PATENT OFFICE 2,318,344

VEHICLE STABILIZER-FORMING APPARATUS

Bertis H. Urschel, Bowling Green, Ohio

Application October 16, 1940, Serial No. 361,443

12 Claims. (Cl. 153—3)

My invention has for its object to provide an apparatus and method for forming articles into predetermined irregular shapes and cause stiffening or hardening to produce permanency of form.

The invention, particularly, relates to an apparatus for forming stabilizers, or sway bars, for conveyances and, particularly, engine driven vehicles, such as, automobiles, trucks, trailers, and railroad and other cars, for eliminating or reducing angular tip or sway of the bodies thereof, which commonly occurs by irregular traction surfaces or alteration of direction of movement of the vehicles, such as when moving on a curve. The load of the vehicle is sustained by the springs that normally vary in their deflections, according to the changes in the load and the changes of the direction of application of the load, with reference to the springs, as the vehicle moves over the roadway. The stabilizers operate to eliminate tilting of vehicle bodies by transmitting a part of the differential pressures on their springs, caused by changes in the traction surface or direction of the movement of the vehicle, from the side of the vehicle that receives the greater pressure to the opposite side of the vehicle, to equalize the pressure and keep the body of the vehicle in its normal upright position. The stabilizers, thus, compensate the difference in the forces that normally cause tilting of the load and equalize the pressure on the springs and prevent relative tilting of the bodies of the vehicles, with respect to the general plane of the traction surface, over which the vehicles move.

Much of the driving and driven parts of the vehicles are mounted between and hang below the height of the springs and, consequently, a straight-through connection between the opposite sides of the vehicle is, as a rule, impossible, and the stabilizer bars have to be irregularly shaped to locate the parts thereof contiguous to the downwardly extending driving or driven parts of the vehicles. Also, the stabilizer bars have to be rigid, in order to efficiently transmit the differences of pressure through the irregularly bent or curved parts. The difference in deflection of the springs, by the difference in pressure thereon, is, commonly, very considerable, and the stabilizer bars should be exceedingly tough or rigid, since they are constantly required to transmit large forces to keep a vehicle in its proper upright relation to the traction surface, over which it moves.

The invention provides a means for bending a heated bar to produce parts that progressively curve into different planes, while maintaining end parts movable toward each other, and in a substantially fixed dimensional relation, and in common planes during the movement toward each other, as the body of the stabilizer bar is curved or bent and cooled.

The shaping and clamping parts of the apparatus are movably supported to permit the parts of the stabilizer bar to move, toward each other, the required limited distances, while the parts are being shaped. Means may, also, be provided for limiting the contraction and produce stretching and accurate shaping of certain parts of the stabilizer bar, during shaping of other parts and cooling of parts or of the whole bar to maintain the bent or curved shapes of the parts in fixed dimensional relations.

The invention consists in other features, which will appear from the following description and upon examination of the drawings forming a part hereof. Structures containing the invention may partake of different forms and may be varied in their details and still embody the invention. To illustrate a practical application of the invention, I have selected a vehicle stabilizer-forming apparatus as an example of the various structures containing the invention and shall describe the selected structure hereinafter, it being understood that certain features of my invention may be used to advantage without a corresponding use of other features of the invention and without departing from the spirit of the invention, as presented in the claims. The particular structure selected is shown in the accompanying drawings.

Figures 10, 11:
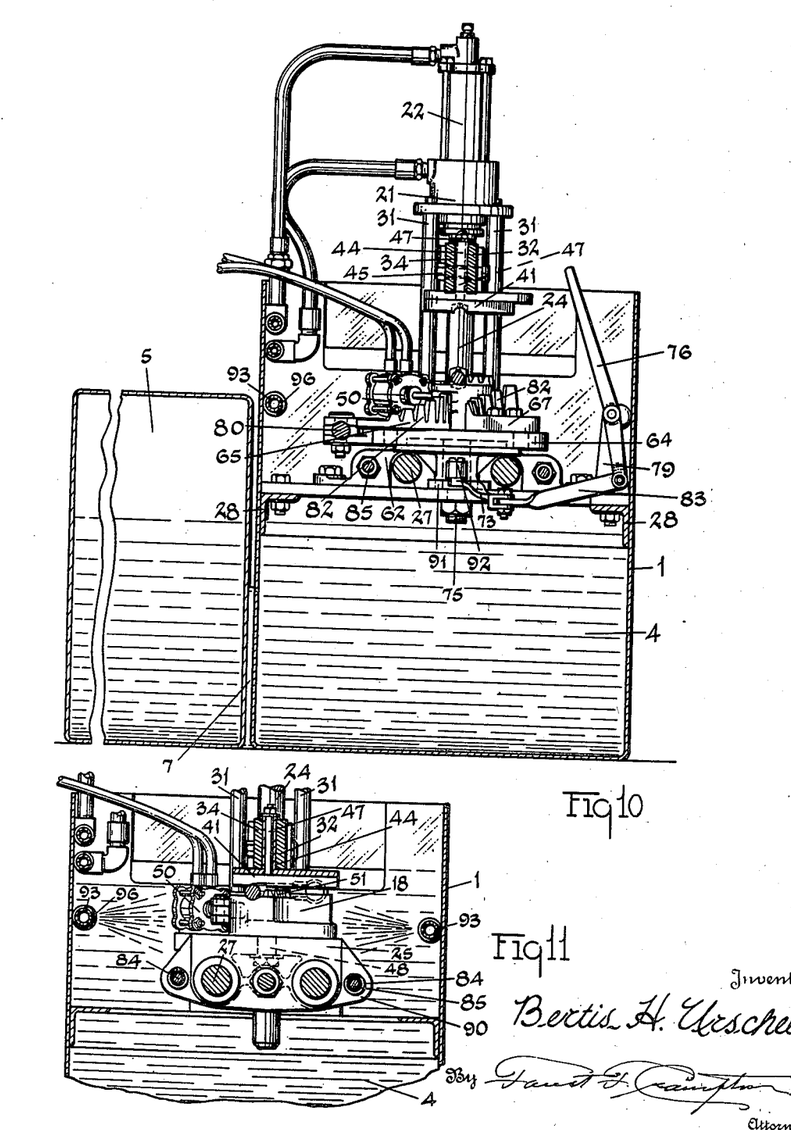
Fig. 10 is a view of a cross section, taken on the plane of the line 10—10, indicated in Fig. 3.
Fig. 11 is a partial view of a cross section, taken on the plane of the line 11—11, indicated in Fig. 5.

In the structure shown in the figures, the base member 1 forms a receptacle for containing a cooling liquid in the lower part thereof. The receptacle has a lower chamber 4. A second receptacle has a chamber 5 (Figs. 3 and 10), that is located contiguous to the chamber 4 and connected thereto, by large passageways 6 and 7. The chamber 5 is formed to receive the bulk of the liquid, when the liquid is not used for chilling the steel articles. The parts of the machine for shaping the heated articles are located in the upper part of the chamber 4 and when the articles are shaped, the level of the liquid is raised in the chamber 4, by pneumatic pressure in the chamber 5 to force the liquid from the chamber and flood the article while it is held by the parts of the shaping machine. When the articles are chilled, the pneumatic pressure is released and the liquid level lowered to the normal height in the chambers 4 and 5.

The particular article treated in the apparatus of the drawings is elongated and may be provided with parts that coact to definitely locate the article in the machine. The article, which is in the form of a bar 12, has end parts or heads 14 and 15 that may be located on movable anvils or shaping members 17 and 18. The article may be suitably heated to a desired temperature and placed and secured in position in the machine, while hot, and, subsequently, shaped or bent and heat-treated by the movement of the liquid to cause the liquid to cover and rapidly cool parts of or the entire article.

A pair of pressure devices 20 and 21 are connected to the anvils 17 and 18 so as to cause movement of the pressure devices 20 and 21 and the anvils, with the heads 14 and 15 of the article, as the article is shaped and contracts by cooling. The pressure devices 20 and 21 comprise cylinders 22 and suitable pistons located therein to cause movement of the piston rods 24. The anvils 17 and 18 and the pressure devices 20 and 21 are mounted on frames 25 that are slidably supported on rods 27, secured to L-irons 28, which form a bracket for supporting the frames 25. The ends of the rods 27 extend into blocks 30 that may be secured to the L-irons 28. The cylinders are supported on the frames 25 by means of the rods 31. The lower ends of the piston rods 24 are, preferably, formed to be located in openings 29 in the frames 25, to enhance their stability, since they are subjected to high clamping and shaping strains. Also, the piston rods 24 are movable within and relative to threaded sleeves 39, connected to the frames 25, for limiting their movements within the openings 29 in the frames 25.

Figures 3, 4:
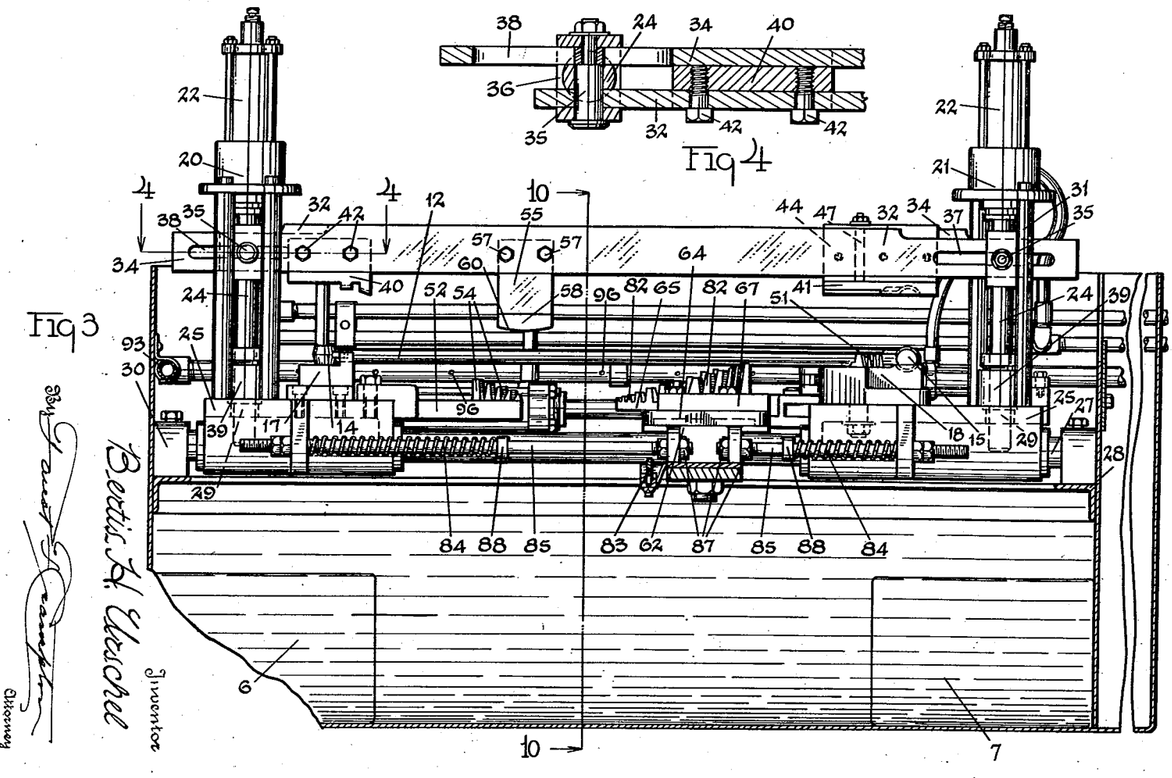
Fig. 3 illustrates a view of a section, taken on the vertical plane of the line 3—3, indicated in Fig. 1, and the stabilizer bar when it has been first placed in the apparatus.
Fig. 4 is a view of a section, taken on the plane of the line 4—4, indicated in Fig. 3, and shows parts of the bending bars of the apparatus.

A pair of bars 32 and 34 are pivotally connected, one to each piston rod 24, by means of pins 35 that extend through the bars and the piston rods. The left end of the bar 32, as shown in Fig. 4, is pivotally supported, by a pin 35, in one piston rod 24, and the right end of the bar 32 is provided with a slot 37 (Fig. 3), through which extends the other pin 35 in the other, or right-hand, piston rod 24. The right end of the bar 34 is pivotally connected, by the said other pin 35, to the right-hand piston rod 24 and the left end of the bar 34 is, also, provided with a slot 38 and is slidably movable with reference to the pin 35 that pivotally supports the bar 32. The bars 32 and 34, preferably, extend through slots 36 formed in the piston rods 24 and each bar is pivotally connected to one piston rod and slidably moves within a slot in the other piston rod. When the piston rods 24 are raised and lowered, the bars are, also, raised and lowered to clamp and shape the article 12 and are, thus, self-adjustable, with respect to the pressure devices.

Each of the bars 32 and 34 is provided with engaging members 40 and 41, and, when the bars are lowered by the operation of the pressure devices, the engaging members 40 and 41 engage the end parts of the article 12 to clamp the end parts against the anvils 17 and 18. The engaging member 40 may be secured to the bar 32, by means of bolts 42, and the engaging member 41 may be pivotally connected to a block 44 that may be secured to the bar 34, by means of bolts 45. The engaging member 41 is pivotally connected to the block 44, by means of a pivot pin 47. When, therefore, the end parts of the article are moved toward each other in the shaping operations of the articles and during the contractual movements of the articles caused by the cooling of the articles, the anvils, the pressure devices, and the engaging members of the end parts of the article move toward each other.

If desired, the right end part of the article may be secured in the same manner as the left end part thereof, by a fixed connection to one of the bars, or both end parts of the article may be secured by rotatable engaging members, such as the engaging member 41.

In the form of construction shown, the engaging member 41 is formed to laterally engage the end part of the article and is rotated when the end part of the article is bent by rotation of the anvil. The anvil 18 is rotatably supported by a pin 48, and means is provided for angularly moving the anvil 18. The means for moving the anvil 18 and its associated engaging member comprises a cylinder 50 and a coacting piston and, when operated by a suitable fluid under pressure, causes the anvil 18 and the engaging member 41 to move a desired angular distance to bend the end part of the article to a desired extent. The anvil 18 is, preferably, provided with a plurality of lugs 51, which, when the anvil is rotated, operate to engage the side of the article and curvilinearly shape the end part of the article.

Figure 1:
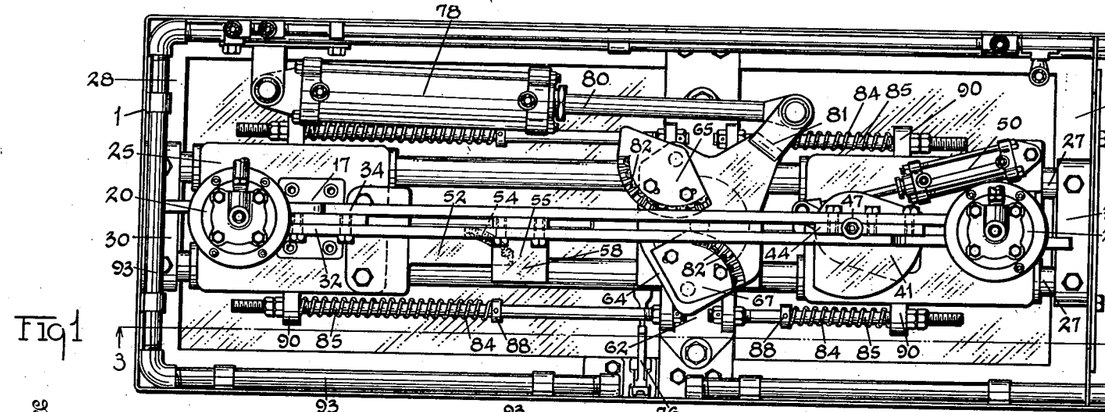
Fig. 1 illustrates a top view of a part of the apparatus, the parts being shown in position to receive the heated stabilizer or sway bar.
Figure 2:
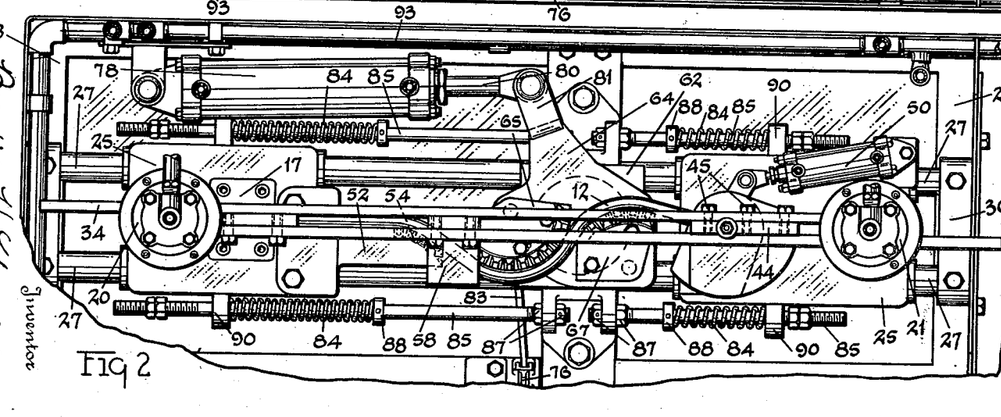
Fig. 2 illustrates a top view of a part of the apparatus and shows certain parts of the bar curvedly bent.
Figure 5:
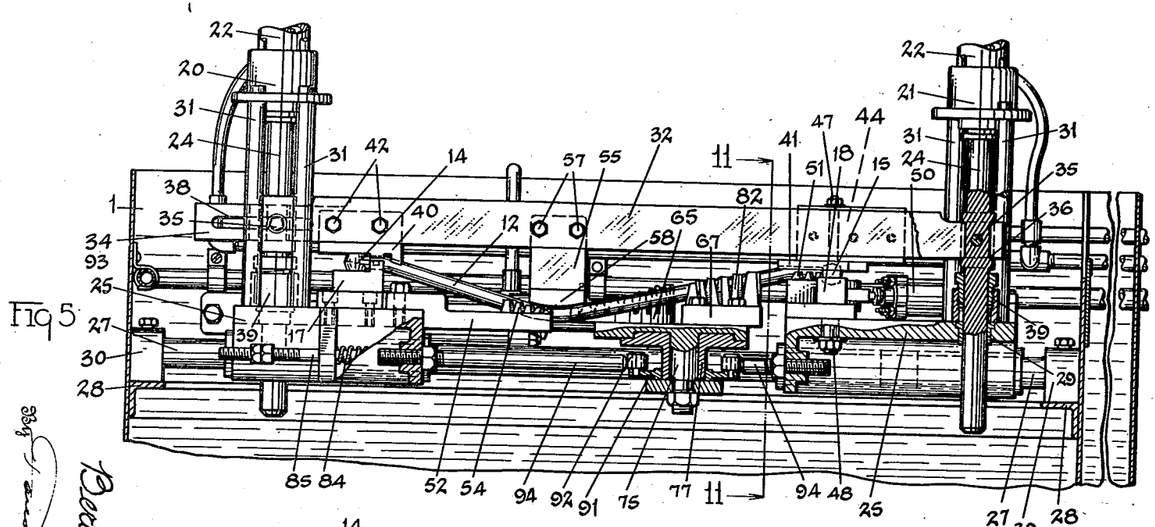
Fig. 5 is a broken view, partly in vertical section, showing details of construction of the apparatus.
Figures 6, 7, 8:
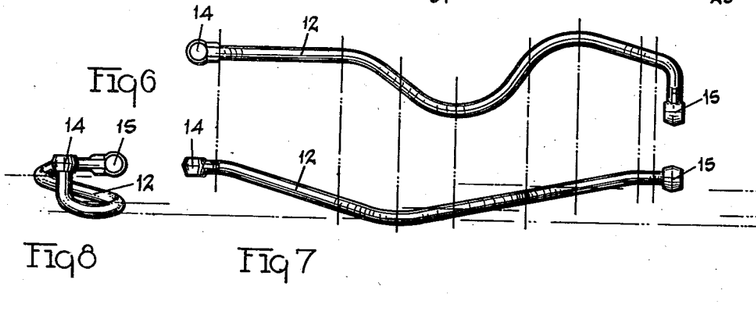
Figs. 6 and 7 show top and side views, respectively, of the stabilizer bar, or vertical and horizontal projections thereof, and lines indicating the identity of the bent portions illustrated in the two figures.
Figs. 8 and 9 show opposite end views of the stabilizer bar and lines to indicate identity of bent portions shown in Figs. 6 to 9, inclusive.
Figure 9:
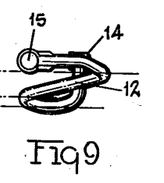

The anvil 17, also, has a shaping member 52 connected thereto. The shaping member 52 has a plurality of lugs 54 for engaging a side of the article to shape it, particularly, when the article is centrally bent in lateral directions, with respect thereto, as shown in Fig. 2. A central bending member 55 (Fig. 5) is connected, by means of bolts 57, to the bar 32. The central bending member 55 is provided with a shoe 58. The shoe 58 has a curved surface 60 that, preferably, is shaped to conform to a desired downward bend that is to be formed in the article. Consequently, when the bars 32 and 34 are moved downward, by the pressure devices 20 and 21, the article is engaged and depressed by the shoe 58, which produces a central downward bend.

A shaping mechanism 61, for laterally bending central parts of the article, is supported on a frame 62 (Fig. 10) mounted on the L-irons 28. A plate 64 is pivotally supported on the frame 62 and a pair of arcuate plates 65 and 67 are pivotally supported on the plate 64, by means of a pair of studs 68 and 70. The plates 65 and 67, having, preferably, curved edge parts, are yieldingly connected to the plate 64 by springs 71, located in recesses 72 formed in the plate 64. Lugs 74 protrude from the plates 65 and 67 into the recesses 72 and are engaged by the springs 71. Thus, upon rotative movement of the plate 64, the plates 65 and 67 move with the plate 64, until they engage opposite sides of the article, and may move against the pressure of the springs 71, relative to the plate 64, within the limits of the slots 66 and bolts 69, and automatically adjust their movement with respect to the plate 64 and the article, according to the various engagements that the plates may make with the article, as the plate 64 is rotated to centrally and laterally bend the article.

The plate 64 is supported, for pivotal movements, by a hub 75 located in a downwardly extending boss 77 of the frame 62. The plate 64 is connected to a fluid pressure device comprising a cylinder 78 and a piston connected to a piston rod 80. The piston rod 80 is connected to an arm 81 that protrudes from the plate 64. Ordinarily, the plate 64 is rotated to laterally and centrally bend the article, subsequent to the central shaping performed by the central bending member 55, upon the operation of the bars 32 and 34. In order to insure the proper seizure of the article 12 by the plates 65 and 67, after it has been shaped by the bending member 55, the plates 65 and 67 are provided with upwardly extending lugs 82, disposed along the curved edges of the plates 65 and 67, to cause bending of the article in opposite directions and form a reverse curve, if desired, in the depressed portion of the article formed by the shoe 58. The article is, thus, progressively engaged by the lugs 82 as the lateral bending of central portions of the article occurs by the operation of the mechanism 61.

The lateral bending of the article, by the mechanism 61, as well as the downward bending, by the central bending member 55, produces forces tending to move the frames 25 inward. Such movement of the frames is yieldingly resisted by means of springs 84 located on rods 85, which are connected to the frame 62 of the mechanism 61, by means of suitable nuts 87. The springs 84 are located intermediate washers 88, that may be adjustably connected to the rods 85, and lugs 90 connected to or forming parts of the frames 25, and operate to subject the end parts of the article to an endwise tension of a high pressure in outward directions from the central part of the article and, thus, resist movement of the frames 25 toward each other and coact to produce a desired curved formation in the central part of the article.

Figure 12:
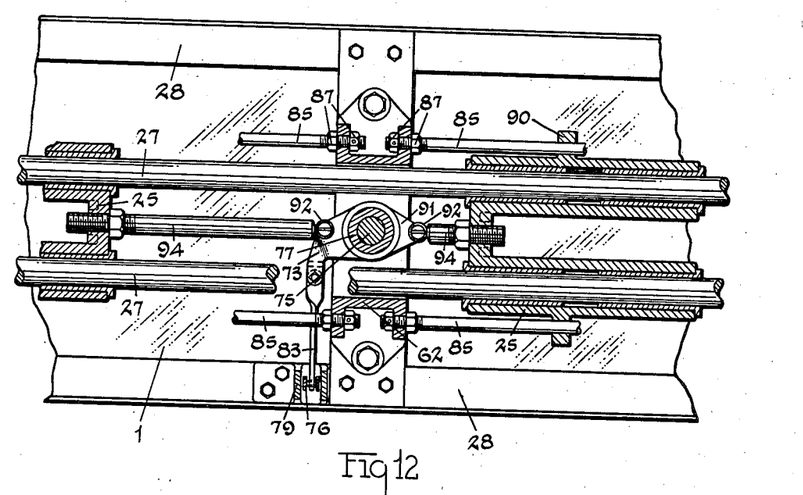
Fig. 12 is a horizontal view of a section of a form of a dimensional control mechanism.

A plate 91 is rotatably supported on the boss 77 of the frame 62 and a pair of rollers 92 are located on the plate 91 and on opposite sides of the axis of the boss 77. The plate 91 has an arm 73, and a lever 76 is pivotally supported on a bracket 79, secured to the L-irons 28 of the receptacle, and connected to the plate 91, by a link 83, to rotate the plate on the boss 77. The frames 25 are provided with round-ended pins 94, Fig. 12, which protrude toward the rollers 92 and are adapted to be, simultaneously, engaged by the rollers 92 when the lever 79 is operated, to limit the inward movement of the frames by the bending operations, if they overcome the elasticity of the springs and to subject the end portions of the article to an extreme tension that insures exact curvilinear formation in all parts of the article after the shaping members have been operated to shape the article.

The elongated article or bar has, thus, by the apparatus shown in the drawings, been bent and shaped to cause its parts to conform to surfaces of the parts of the vehicle between the springs, and its end parts may be connected to the side springs of the vehicle to deflect them equally. The shape of the article formed by the machine is shown in Figs. 6 to 9, inclusive, to present an accurate configuration of the article, which could not be presented by a perspective view of the article, by reason of the fact that many of the bends are formed in planes at different angles to each other and the bent portions extend into each other. Lines are shown therein to indicate location of the same points of the article in the different figures showing the article.

The shaping operation of the article is thus completed, while the article is still hot and has a temperature proper for producing hardening of the steel of which the article may be formed, and when or as the cooling fluid is raised to a point to partially or completely submerge the article, certain or all of the shaping members may be released to produce, more or less, free contraction of parts of the article.

If desired, pipes 93, having a plurality of outlets 96, preferably, located below the lever, to which the liquid is raised by pneumatic pressure, conduct a cooling liquid under pressure to the outlets 96 and to parts of the machine and the article for cooling the said parts, and, also, if desired, to cause (Fig. 11) streams of the cooling liquid, raised by pneumatic pressure, to flow toward the said parts and produce a rapid cooling of the parts.

When the pins 94 are released by the operation of the lever 79, and the rollers 92 are moved from the ends of the pins 94, relative inward movements of the frames 25 are caused by the cooling of the article by the liquid. If desired, the extent of the contractual movements, caused by cooling the article, may be limited to insure dimensionally predetermined shapes, in the form of construction shown in Fig. 13, which may be used in the place of the device shown in Fig. 12.

Figures 13, 14:
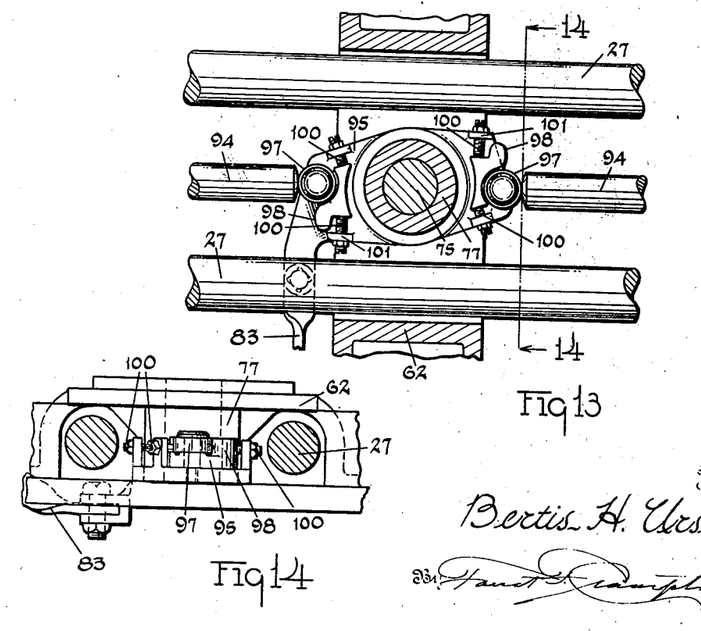
Fig. 13 is a modified form of a dimensional control mechanism for limiting the extent of the contraction of the stabilizer bar when cooling.
Fig. 14 is a view of a section, taken on the plane of the line 14—14, indicated in Fig. 13.
Figure 15:
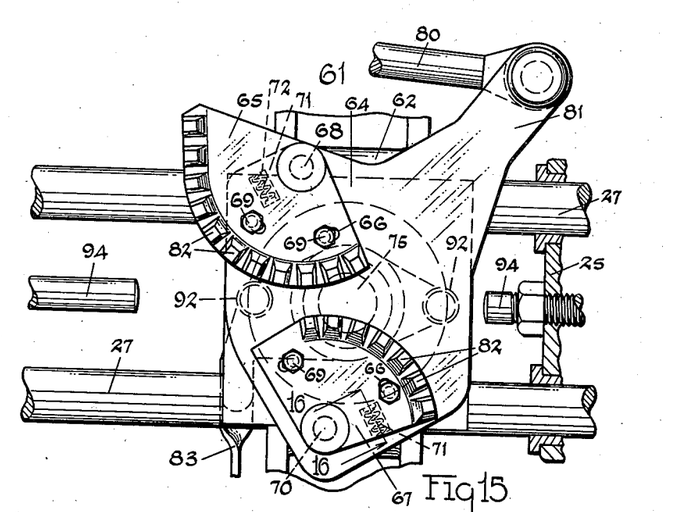
Fig. 15 is a top view of a bending mechanism for producing opposite curves in a depressed portion of the stabilizer bar.
Figure 16:
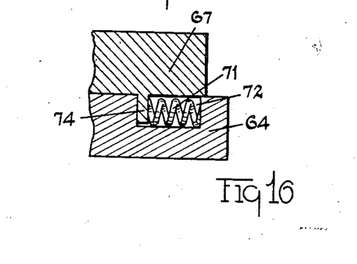
Fig. 16 is a view of a section of one of a pair of resilient springs for permitting play of the clamping members that clamp the stabilizer bar, taken on the plane of the line 16—16, indicated in Fig. 15.
Figure 17:
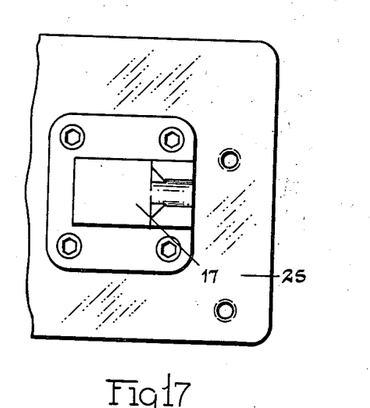
Fig. 17 illustrates a plate for engaging one end part of the stabilizer bar.
Figure 18:
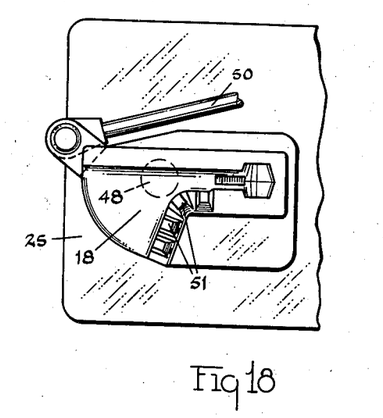
Fig. 18 illustrates a pivoted plate, having parts for engaging another end part of the stabilizer bar and bending said end part.

In the form of construction shown in Fig. 13, the plate 91 is broadened to form the plate 95, which may be pivotally supported on the boss 77. The plate 95 is, also, provided with rollers 97, similar to the rollers 92, which engage the rounded ends of the pins 94. When the pins 94 are released from the rollers 97, by the lever 76, they engage, upon contraction of the article, a pair of cams 98, adjustably secured, by screws 100, to the plate 95. The screws 100 extend through lugs 101 formed on the plate 95. The cams may be located, by the lever 76, in a position in alignment with the pins 94 when the plate 95 is turned to move the rollers 97 from the ends of the pins 94. The cams 98 are, then, in position to engage the pins 94 during their movements, caused by the contraction of the cooling article, to limit, to a predetermined degree, the extent of the relative contractual movements of the end parts of the article and, if desired, as the shaping members release the article, to insure the exact shaping of the article to predetermined measurements.

I claim:

1. In an apparatus for shaping elongated metal articles; a pair of movable anvils for supporting end parts of each article; a pair of pressure devices supported on the anvils; a pair of bars operated by the pressure devices; a pair of clamping elements movable along the bars for clamping the end parts of the article to the anvils; a shaping member located intermediate the anvils for shaping the article and moving the anvils and the said elements; and means for operating the shaping member.

2. In an apparatus for shaping elongated metal articles; a plurality of article-shaping members having different characteristic shaping parts; means for actuating certain of the members to bend central parts of the article and locate the bends in different planes of the elongated article; and means for separating the members from each other to force the articles against the shaping parts of the members after the members have operated.

3. In an apparatus for shaping elongated metal articles; a plurality of article-shaping members comprising an outer clamping member and an outer article-shaping member for shaping an end part of the article; an inner shaping member for shaping an intermediate part of the article; a pressure means for actuating each of the members; a yielding means for preventing movement of the outer of the members toward each other; and means for forcing outer members from each other a predetermined distance.

4. In an apparatus for shaping elongated metal articles; a pair of anvils for supporting end parts of each article in a common plane; one of the anvils slidably supported for movement toward the other; means for rotatably supporting one of the anvils; a pair of clamping elements for clamping the end parts to the anvils; means for rotating one of the elements and its associated anvil about an axis at right angles to the article engaging surfaces; and a rotatable shaping member located intermediate the anvils to oppositely bend the article.

5. In an apparatus for shaping an elongated metal article; a pair of anvils each movable toward the other anvil for supporting the end parts of the article in a common plane; clamping elements for clamping the article to the anvils; a rotatable shaping member located intermediate the anvils; a pressure device for operating the shaping member and drawing the anvils toward each other; and means for separating the anvils to draw the article against the shaping member.

6. In an apparatus for shaping elongated metal articles; a pair of anvils for supporting end parts of articles; means for slidably supporting each anvil to move in a direction toward the other; a pair of pressure devices connected to the anvils; a pair of pivotally and slidably supported bars connected and operated by the pressure devices; a pair of clamping elements slidably connected to the pressure devices for clamping the end parts of the article to the anvils; a shaping member for shaping central portions of the article and slidably moving the pressure devices, anvils, and elements; and means for operating the shaping member.

7. In an apparatus for shaping elongated metal articles; a pair of anvils for supporting end parts of each article; a pair of parallel operating pressure devices; a pair of bars pivotally and slidably connected to the pressure devices and operated by the pressure devices; a pair of clamping elements connected to the pressure devices for clamping the end parts of the article to the anvils; and means for rotatably moving one of the clamping elements and its associated anvils relative to the bars to shape an end part of the article.

8. In an apparatus for shaping elongated metal articles; a pair of anvils for supporting end parts of each article; a pair of engaging elements for securing the end parts of the article to the anvils; means for rotating one of the anvils and its associated engaging element for shaping an end part of the article; a shaping member fixedly secured relative to the other of the said anvils to prevent lateral movement of the other end part of the article; and a shaping member located intermediate the anvils for oppositely bending a central part of the article.

9. In an apparatus for shaping elongated metal articles; a pair of movable anvils for supporting end parts of each article; a pair of pressure devices; a pair of bars pivotally supported on the pressure devices and operated by the pressure devices; a pair of engaging elements connected to the pressure devices for securing the end parts of the article to the anvils; a rotatable shaping member located intermediate the anvils for laterally bending a central part of the article; means for rotating the rotatable shaping member; and means for moving the anvils and pressure devices from the rotatable shaping member.

10. In an apparatus for shaping elongated metal articles; a pair of movable anvils for supporting end parts of each article; a pair of pressure devices supported on the anvils; a pair of bars pivotally and slidably supported on the pressure devices and operated by the pressure devices; a pair of engaging elements connected to the pressure devices and located on the bars for securing end parts of the article to the anvils in a common plane; a shaping member supported on the bars for centrally bending the article downwardly; a shaping member located intermediate the anvils for centrally bending the article laterally; and means for separating the anvils.

11. In an apparatus for shaping elongated metal articles; a plurality of movable, article-shaping members comprising a plurality of inner article-shaping members for bending the central portions of the article; a pair of outer article-shaping members, one of the outer shaping members for bending an end part of the article, and a plurality of actuating means, each of said actuating means independently actuating a member to produce bends in central parts of the article and in planes parallel to the axes of the article; and means for limiting the inward movement of the outer members by the bending movements of the central parts of the articles by the said inner article-shaping members.

12. In an apparatus for shaping metal articles; a pair of anvils movable toward and away from each other for supporting an article; clamping elements for clamping end parts of the article to the anvils; a pressure device connected to and movable with each anvil for operating each clamping element and maintaining the central axes of the end parts in a common plane; a shaping member located intermediate the anvils and operated by the said pressure devices for shaping a central part of the article; and another pressure device for operating one of the clamping elements to angularly bend one of the said end parts.

BERTIS H. URSCHEL.